US007346028B2

(12) United States Patent
Pattenden et al.

(10) Patent No.: US 7,346,028 B2
(45) Date of Patent: Mar. 18, 2008

(54) METHODS AND APPARATUS FOR PROCESSING RADIO MODEM COMMANDS DURING NETWORK DATA SESSIONS

(75) Inventors: Christopher E. S. Pattenden, Waterloo (CA); Joseph T. Deu-Ngoc, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 531 days.

(21) Appl. No.: 10/880,390

(22) Filed: Jun. 29, 2004

(65) Prior Publication Data

US 2004/0264406 A1   Dec. 30, 2004

(30) Foreign Application Priority Data

Jun. 30, 2003   (EP)   ................................. 03254163

(51) Int. Cl.
*H04Q 7/00* (2006.01)
*H04B 1/38* (2006.01)
(52) U.S. Cl. ....................... 370/328; 375/222
(58) Field of Classification Search ............. 370/310.2; 375/222
See application file for complete search history.

(56) References Cited

U.S. PATENT DOCUMENTS

| 5,535,242 | A | 7/1996 | Brigida et al. |
| 6,526,092 | B1 * | 2/2003 | Nelson et al. ............... 375/222 |
| 6,847,819 | B1 * | 1/2005 | Sprigg et al. ............... 455/445 |
| 7,110,371 | B2 * | 9/2006 | Monroe et al. ............ 370/310.2 |

FOREIGN PATENT DOCUMENTS

| EP | 03254163.3 | 12/2003 |
| WO | WO 99 35549 A | 7/1999 |
| WO | WO 01 50706 A | 7/2001 |
| WO | WO 02 31671 A | 4/2002 |
| WO | WO 02 067599 A | 8/2002 |

* cited by examiner

*Primary Examiner*—William Trost
*Assistant Examiner*—Marivelisse Santiago-Cordero
(74) *Attorney, Agent, or Firm*—John J. Oskorep, Esq.

(57) ABSTRACT

A radio modem method of processing commands from a host device during a data communication session between the host device and a server connected to the network includes the steps of maintaining a Point-to-Point Protocol (PPP) connection between the host device and the radio modem device; communicating, over a wireless link with a cellular telecommunications network, data packets of an IP connection maintained between the host device and the server; and while the PPP and the IP connections are being maintained: removing a PPP wrapper of the data packets to reveal a destination IP address; identifying whether the destination IP address matches an IP address of a radio modem server of the radio modem device; in response to identifying a match between the IP addresses, causing the data packets to be routed to the radio modem server and processing and responding to the host device in accordance with a command in the data packets at the radio modem server; and in response to identifying a mismatch between the IP addresses, causing the data packets to be routed to the server over the wireless link with the cellular telecommunications network.

21 Claims, 4 Drawing Sheets

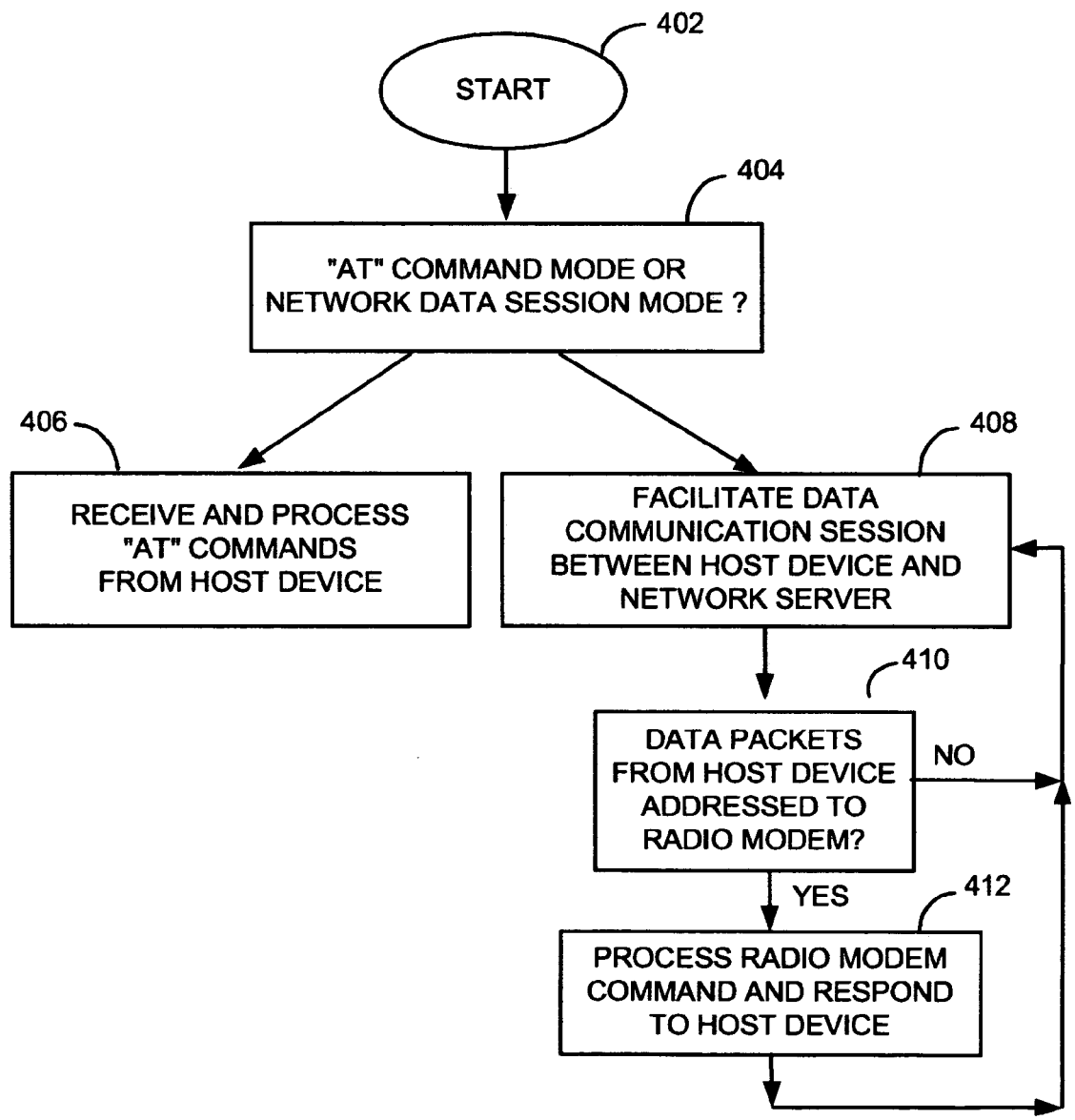

METHODS AND APPARATUS FOR PROCESSING RADIO MODEM COMMANDS DURING NETWORK DATA SESSIONS

CROSS-REFERENCE TO RELATED APPLICATION

This application claims priority to European Patent Application No. 03254163.3 entitled "Methods And Apparatus For Processing Radio Modem Commands During Network Data Sessions" having a filing date of Jun. 30, 2003 which is hereby incorporated by reference herein.

BACKGROUND

1. Field of the Invention

The present invention relates generally to radio modems and host devices used in connection therewith, and more particularly to methods and apparatus for processing radio modem commands from a host device during a data communication session between the host device and a network server.

2. Description of the Problem

A radio modem typically includes a radio frequency (RF) transceiver for communicating with a wireless communication network and a host interface, such as an RS-232 interface, for connecting with a host device. In an AT command mode, the radio modem is able to receive, process, and respond to conventional AT commands from the host device. The AT command mode lets the host device obtain "real-time" radio-specific information, such as radio signal strength information and wireless network operator information, among other information, from the radio modem. On the other hand, in a network data session mode, the radio modem helps maintain a data communication session between the host device and a server of a communication network through an RF link. The data communication session may involve an Internet Protocol (IP) connection through which addressable data packets are passed back and forth between the host device and the network server.

During the data communication session, AT command processing between the host device and the radio modem is generally not available. Therefore, "real-time" radio-specification information cannot be easily obtained by the host device from the radio modem during the network data session. This information might be useful to the host device, for example, if the information were to be visually displayed (e.g. for visual display of a radio signal strength indicator or a wireless network operator identifier) or otherwise processed. It would be too complex and costly if additional interfaces were provided on the devices exclusively for AT command processing. Heroic techniques (e.g. breaking into the data session link, sending command and response information, and reestablishing the data session link) are complicated, prone to failure, and require modification of the host device's data session protocol.

Accordingly, there is a resulting need for methods and apparatus for processing radio modem commands during network data sessions.

SUMMARY

A radio modem method of processing commands from a host device during a data communication session between the host device and a server connected to the network includes the steps of maintaining a Point-to-Point Protocol (PPP) connection between the host device and the radio modem device; communicating, over a wireless link with a cellular telecommunications network, data packets of an IP connection maintained between the host device and the server; and while the PPP and the IP connections are being maintained: removing a PPP wrapper of the data packets to reveal a destination IP address; identifying whether the destination IP address matches an IP address of a radio modem server of the radio modem device; in response to identifying a match between the IP addresses, causing the data packets to be routed to the radio modem server and processing and responding to the host device in accordance with a command in the data packets at the radio modem server; and in response to identifying a mismatch between the IP addresses, causing the data packets to be routed to the server over the wireless link with the cellular telecommunications network.

BRIEF DESCRIPTION OF THE DRAWINGS

Embodiments of present invention will now be described by way of example with reference to attached figures, wherein:

FIG. 4 is a flowchart for describing a method of operation for the radio modem device in FIGS. 1-3.

DETAILED DESCRIPTION OF THE PREFERRED EMBODIMENTS

Figure 1:
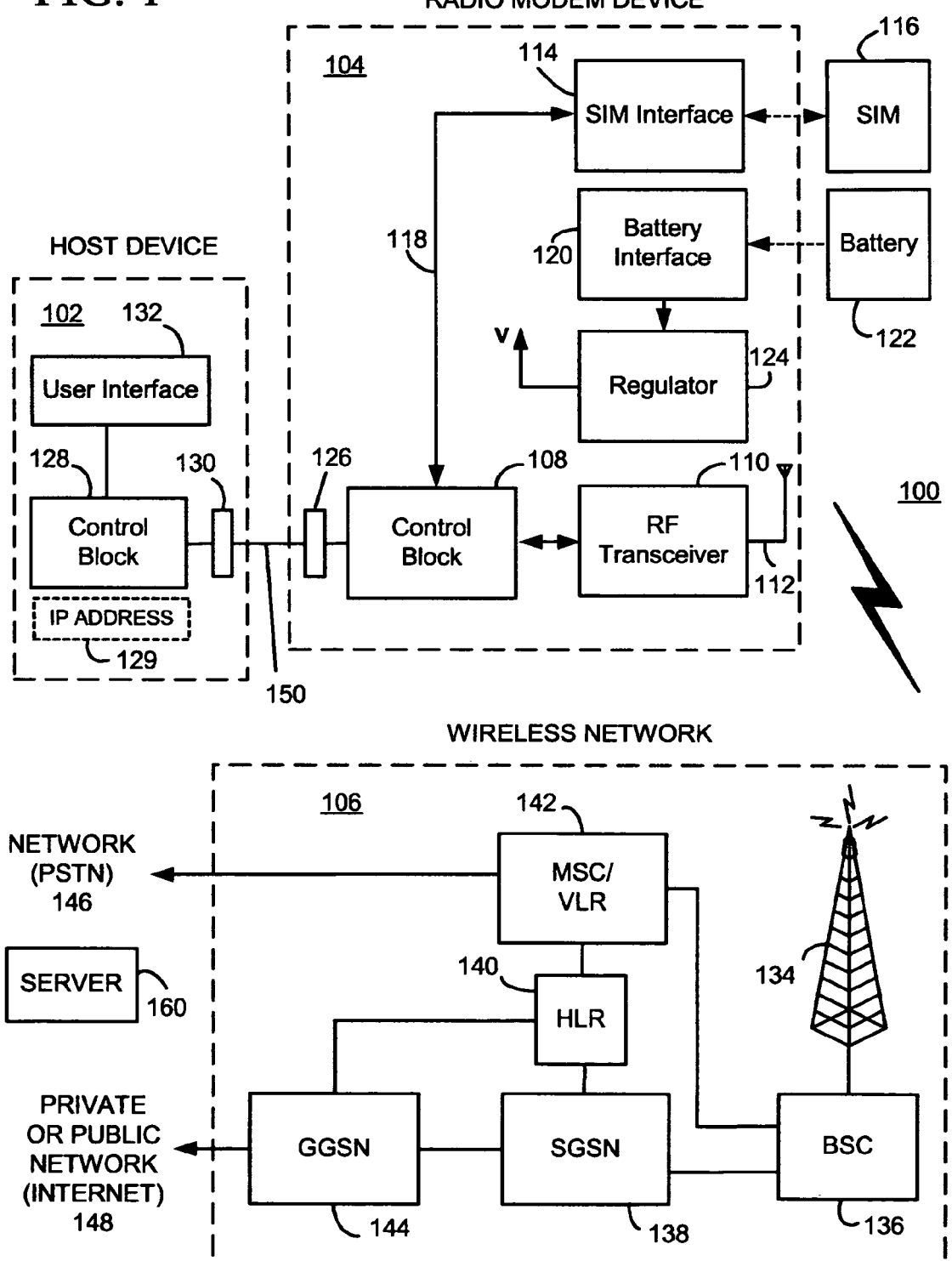
FIG. 1 is a block diagram which illustrates pertinent components of a host device and a radio modem device for communicating through a wireless communication network.

FIG. 1 is a block diagram of a communication system 100 which includes a host device 102, a radio modem device 104, and a wireless communication network 106. In general, radio modem device 104 provides wireless communication capability and mobility for host device 102 over a radio frequency (RF) link. With use of radio modem device 104, host device 102 is able to communicate with a server (such as a server 160 of a network 146 or 148) through wireless network 106. Preferably, data communication sessions between host device 102 and server 160 involve the communication of data packets over an Internet Protocol (IP) connection as will be described in more detail later below.

Host device 102 and radio modem device 104 may be separate and independent electronic devices, each having electrical and mechanical components housed in separate housing units. Alternatively, host device 102 and radio modem device 104 may be housed together in the same housing unit (e.g. in a laptop computer application). In either case, host device 102 is coupled to radio modem device 104 for data communication through a connection, such as a wired connection 150. Wired connection 150 and data communication between host device 102 and radio modem device 104 are made possible through electrical/mechanical interfaces 126 and 130 of radio modem device 104 and host device 102, respectively. Interfaces 126 and 130 may be configured in accordance with an RS-232 data interface standard, for example. However, any other suitable interface or interface standard may be utilized as an alternative. Together, host device 102 and radio modem device 104 may be referred to as a "mobile station" which operates in wireless network 106.

Host device 102 includes a control block 128 which is coupled to interface 130. Control block 128 may be or include one or more processors, such as a microprocessor, which executes a software application for host device 102. This software application operates in part to control radio modem device 104 for operation in connection with wireless network 106 and server 160. Additional functionality of the software application will vary and depend on the specific application of host device 102. Typically, host device 102 also includes a user interface 132, which may include one or more user-actuable switches, a keyboard, and/or a display, coupled to control block 128. The display operates to visually display received information, stored information, user inputs, and the like. The keyboard, which may be a telephone type keypad or full alphanumeric keyboard, is normally provided for entering data for storage, information for transmission through wireless network 106, a telephone number to place a telephone call, commands to be executed, and perhaps other or different user inputs.

Radio modem device 104 generally includes a control block 108, a radio frequency (RF) transceiver 110, and an antenna 112. Control block 108 is coupled to interface 126 as well as to RF transceiver 110, which is coupled to antenna 112. Typically, control block 108 is embodied as a processor or central processing unit (CPU) which runs operating system software in a memory component (not shown in FIG. 1). Control block 108 will normally control overall operation of radio modem device 104 (along with control block 128 of host device 102), whereas specific signal processing operations associated with communication functions are typically performed in RF transceiver 110.

The combined host device 102 and radio modem device 104 (i.e. the mobile station) sends communication signals to and receives communication signals from wireless network 106 over RF link via antenna 112. RF transceiver 110 of radio modem device 104 typically includes an RF receiver, an RF transmitter, and associated components, such as one or more local oscillators (LOs), a processing module such as a digital signal processor (DSP) which may be part of control block 108, and an RF power amplifier (PA). In particular, signals received by antenna 112 from wireless network 106 are input to RF transceiver 110, which may perform common RF receiver functions as signal amplification, frequency down conversion, filtering, channel selection, analog-to-digital (A/D) conversion, and the like. A/D conversion of a received signal allows more complex communication functions such as demodulation and decoding to be performed in the DSP. In a similar manner, signals to be transmitted are processed, including modulation and encoding, for example, by the DSP. These DSP-processed signals are then fed for digital-to-analog (D/A) conversion, frequency up conversion, filtering, amplification and transmission over communication network via antenna 112. The DSP may not only process communication signals, but may also provide for some control of the receiver and transmitter. It will be apparent to those skilled in art that RF transceiver circuitry 110 will be adapted to particular wireless network or networks in which the mobile station is intended to operate.

In this particular embodiment, the mobile station also operates using a Subscriber Identity Module (SIM) 116 which is connected to or inserted at a SIM interface 114. SIM 116 is one type of a conventional "smart card" used to identify an end user (or subscriber) of the mobile station and to personalize the device, among other things. Without SIM 116, the mobile equipment is not fully operational for communication through wireless network 106. By inserting SIM 116 into radio modem device 104, an end user can have access to any and all of his/her subscribed services. Since SIM 116 is coupled to SIM interface 114, it is coupled to control block 108 through communication lines 118. In order to identify the subscriber, SIM 116 contains some user parameters such as an International Mobile Subscriber Identity (IMSI). An advantage of using SIM 116 is that end users are not necessarily bound by any single physical mobile station. SIM 116 may store additional user information for the mobile station as well, including datebook (or calendar) information and recent call information. In the embodiment shown, SIM interface 114 is provided in radio modem device 104; however, SIM interface 114 may be alternatively provided in host device 102. As shown, the mobile station may also include a battery interface 120 for receiving one or more rechargeable batteries 122. Battery 122 provides electrical power to electrical circuitry, and battery interface 120 provides for a mechanical and electrical connection for battery 122. Battery interface 120 is coupled to a regulator 124 which regulates power to the device. As an alternative to battery interface 120 and battery 122, the mobile station may include an interface to a standard AC power outlet.

Host device 102 and radio modem device 104 may be or include devices (and/or have functionality associated with devices) such as cellular telephones, e-mail messaging terminals, Internet-access terminals, personal digital assistants (PDAs), handheld terminals, laptop computers, palmtop computers, financial transaction terminals, vehicle locator terminals, monitoring or metering equipment, etc. In a laptop computer application, for example, radio modem device 104 may be inserted in a port on the laptop computer which is host device 102. In this case, the laptop computer (i.e. host device 102) would include a display monitor, a keyboard, and a mouse for user interface 132 and control block 128 would be embodied as the computer's CPU. A preferred application that may be used is a personal information manager (PIM) application having the ability to organize and manage data items relating to user such as, but not limited to, e-mail, calendar events, voice mails, appointments, and task items. Naturally, one or more memory stores are available on the mobile station to facilitate storage of PIM data items and other information. The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on the mobile station with respect to such items. This is especially advantageous where the host computer system is the mobile station user's office computer system.

Received data signals, such as text messages, e-mail messages, web page downloads, or other data items, are processed by RF transceiver 110, input to control block 108, and sent to host device 102 through wired connection 150. Control block 128 of host device, 102 further processes the signals for output to user interface 132 (a visual display or the like). A user of the mobile station may also compose data items, such as a text or e-mail message, or submit data items to a web page, for example, using the keyboard in conjunction with the display or perhaps with an auxiliary I/O device of host device 102. These data items are received by control block 128 of host device 102, sent to radio modem device 104 through wired connection 150, received at control block 108 of radio modem device 104, and transmitted by RF transceiver 110 to server 160 through wireless network 106.

In the particular embodiment shown in FIG. 1, radio modem device 104 and wireless network 106 are configured in accordance with Global Systems for Mobile communication (GSM) and General Packet Radio Service (GPRS) for communication over the RF link. However, any suitable wireless technologies may be employed, such as those associated with Code Division Multiple Access (CDMA), Mobitex, and DataTAC data networks. As shown in the embodiment of FIG. 1, wireless network 106 includes a base station controller (BSC) 136 with an associated tower station 134, a Mobile Switching Center (MSC) 142, a Home Location Register (HLR) 140, a Serving General Packet Radio Service (GPRS) Support Node (SGSN) 138, and a Gateway GPRS Support Node (GGSN) 144. MSC 142 is coupled to BSC 136 and to a landline network, such as a Public Switched Telephone Network (PSTN) 146. SGSN 138 is coupled to BSC 136 and to GGSN 14, which is in turn coupled to a public or private data network 148 (such as the Internet). HLR 140 is coupled to MSC 142, SGSN 138, and GGSN 144.

Station 134 is a fixed transceiver station, and station 134 and BSC 136 are together referred to herein as the fixed transceiver equipment. The fixed transceiver equipment provides wireless network coverage for a particular coverage area commonly referred to as a "cell". The fixed transceiver equipment transmits communication signals to and receives communication signals from mobile stations within its cell via station 134. The fixed transceiver equipment normally performs such functions as modulation and possibly encoding and/or encryption of signals to be transmitted to the mobile station in accordance with particular, usually predetermined, communication protocols and parameters, under control of its control block. The fixed transceiver equipment similarly demodulates and possibly decodes and decrypts, if necessary, any communication signals received from the mobile station within its cell. Communication protocols and parameters may vary between different networks. For example, one network may employ a different modulation scheme and operate at different frequencies than other networks. The wireless link shown in communication system 100 of FIG. 1 represents one or more different channels, typically different radio frequency (RF) channels, and associated protocols used between wireless network 106 and the mobile station. Those skilled in art will appreciate that a wireless network in actual practice may include hundreds of cells, each served by a station 134 (i.e. or station sector), depending upon desired overall expanse of network coverage. All pertinent components may be connected by multiple switches and routers (not shown), controlled by multiple network controllers.

For all mobile stations registered with a network operator, permanent data (such as the mobile station user's profile) as well as temporary data (such as the mobile station's current location) are stored in HLR 140. In case of a voice call to the mobile station, HLR 140 is queried to determine the current location of the mobile station. A Visitor Location Register (VLR) of MSC 142 is responsible for a group of location areas and stores the data of those mobile stations that are currently in its area of responsibility. This includes parts of the permanent mobile station data that have been transmitted from HLR 140 to the VLR for faster access. However, the VLR of MSC 142 may also assign and store local data, such as temporary identifications. Optionally, the VLR of MSC 142 can be enhanced for more efficient co-ordination of GPRS and non-GPRS services and functionality (e.g. paging for circuit-switched calls which can be performed more efficiently via SGSN 138, and combined GPRS and non-GPRS location updates).

Serving GPRS Support Node (SGSN) 138 is at the same hierarchical level as MSC 142 and keeps track of the individual locations of mobile stations. SGSN 138 also performs security functions and access control. Gateway GPRS Support Node (GGSN) 144 provides interworking with external packet-switched networks and is connected with SGSNs (such as SGSN 138) via an IP-based GPRS backbone network. SGSN 138 performs authentication and cipher setting procedures based on the same algorithms, keys, and criteria as in existing GSM. In order to access GPRS services, the mobile station first makes its presence known to wireless network 106 by performing what is known as a GPRS "attach". This operation establishes a logical link between the mobile station and SGSN 138 and makes the mobile station available to receive, for example, pages via SGSN, notifications of incoming GPRS data, SMS messages over GPRS, etc. In order to send and receive GPRS data, the mobile station assists in activating the packet data address that it wants to use. This operation makes the mobile station known to GGSN 144; interworking with external data networks can thereafter commence. User data may be transferred transparently between the mobile station and the external data networks using, for example, encapsulation and tunneling. Data packets are equipped with GPRS-specific protocol information and transferred between the mobile station and GGSN 144.

As described above, host device 102 is able to communicate with server 160 through wireless network 106 with use of radio modem device 104. Preferably, data communication sessions between host device 102 and server 160 preferably involve the communication of data packets through an Internet Protocol (IP) connection. As shown in FIG. 1, host device 102 is assigned IP address 129 which is used for such data session.

Figure 2:
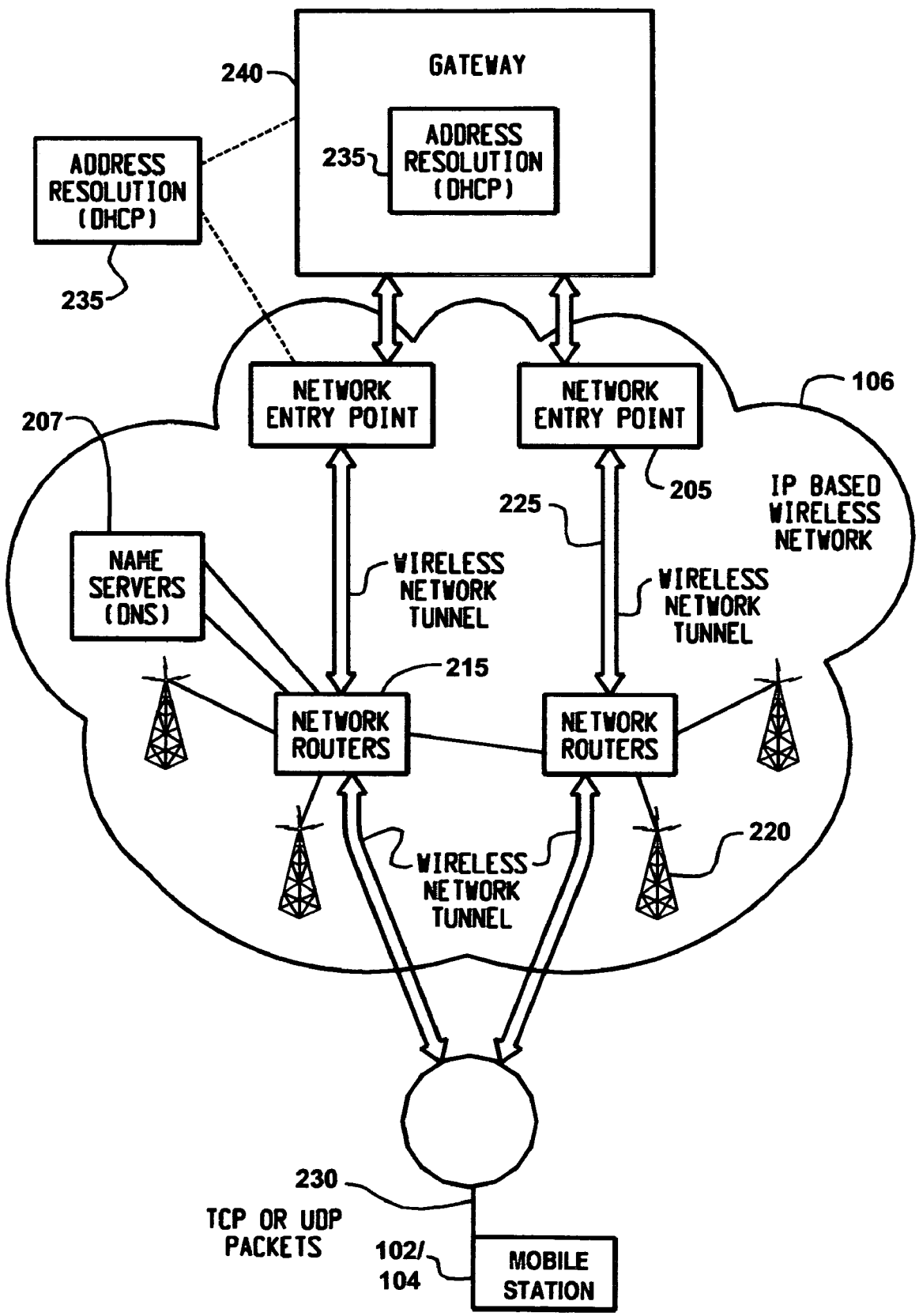
FIG. 2 is a particular system structure for communicating with the radio modem device through the wireless communication network.

FIG. 2 illustrates a system structure for communicating with mobile station 102/104, showing basic components of an IP-based wireless data network, which is one type of packet data network. As shown in FIG. 2, a gateway 240 may be coupled to an internal or external address resolution component 235 and one or more network entry points 205. Data packets are transmitted from gateway 240, which is source of information to be transmitted to mobile station 102/104, through wireless network 106 by setting up a wireless network tunnel 225 from gateway 240 to mobile station 102/104. In order to create this wireless tunnel 225, a unique network address is associated with mobile station 102/104. In an IP-based wireless network, however, network addresses are typically not permanently assigned to a particular mobile station 102/104 but instead are dynamically allocated on an as-needed basis. It is thus preferable for mobile station 102/104 to acquire a network address and for gateway 240 to determine this address so as to establish wireless tunnel 225.

Network entry point 205 is generally used to multiplex and demultiplex amongst many gateways, corporate servers, and bulk connections such as the Internet, for example. There are normally only a limited number of these network entry points 205, since they are also intended to centralize externally available wireless network services. Network entry points 205 often use some form of an address resolution component 235 that assists in address assignment and lookup between gateways and mobile stations. In this example, address resolution component 235 is shown as a dynamic host configuration protocol (DHCP) as one method for providing an address resolution mechanism.

A central internal component of wireless network 106 of FIG. 2 is a network router 215. Normally, network routers 215 are proprietary to the particular network, but they could alternatively be constructed from standard commercially available hardware. The purpose of network routers 215 is to centralize thousands of fixed transceiver stations 220 normally implemented in a relatively large network into a central location for a long-haul connection back to network entry point 205. In some networks there may be multiple tiers of network routers 215 and cases where there are master and slave network routers 215, but in all such cases the functions are similar. Often network router 215 will access a name server 207, in this case shown as a dynamic name server (DNS) 207 as used in the Internet, to look up destinations for routing data messages. Fixed transceiver equipment 220, as described above, provides wireless links to mobile stations such as mobile station 102/104.

Wireless network tunnels such as a wireless tunnel 225 are opened across wireless network 106 in order to allocate necessary memory, routing, and address resources to deliver IP packets. Such tunnels 225 are established as part of what are referred to as Packet Data Protocol or "PDP" contexts.

To open wireless tunnel 225, mobile station 102/104 may indicate the domain or network entry point 205 with which it wishes to open wireless tunnel 225. In this example, the tunnel first reaches network router 215 which uses name server 207 to determine which network entry point 205 matches the domain provided. Multiple wireless tunnels can be opened from one mobile station 102/104 for redundancy, or to access different gateways and services on the network. Once the domain name is found, the tunnel is then extended to network entry point 205 and necessary resources are allocated at each of the nodes along the way.

Network entry point 205 then uses the address resolution (or DHCP 235) component to allocate an IP address for mobile station 102/104. In particular, this IP address is assigned to host device 102 and stored as IP address 129 (see FIG. 1). When the IP address has been allocated to the host device and communicated to gateway 240 (FIG. 2), information can then be forwarded from gateway 240 to mobile station 102/104.

Wireless tunnel 225 of FIG. 2 typically has a limited life, depending on mobile station's 102/104 coverage profile and activity. Wireless network 106 will tear down wireless tunnel 225 after a certain period of inactivity or out-of-coverage period, in order to recapture resources held by this wireless tunnel 225 for other users. The main reason for this is to reclaim the IP address temporarily reserved for mobile station 102/104 when wireless tunnel 225 was first opened. Once the IP address is lost and wireless tunnel 225 is torn down, gateway 240 loses all ability to initiate IP data packets to mobile station 102/104.

Figure 3:
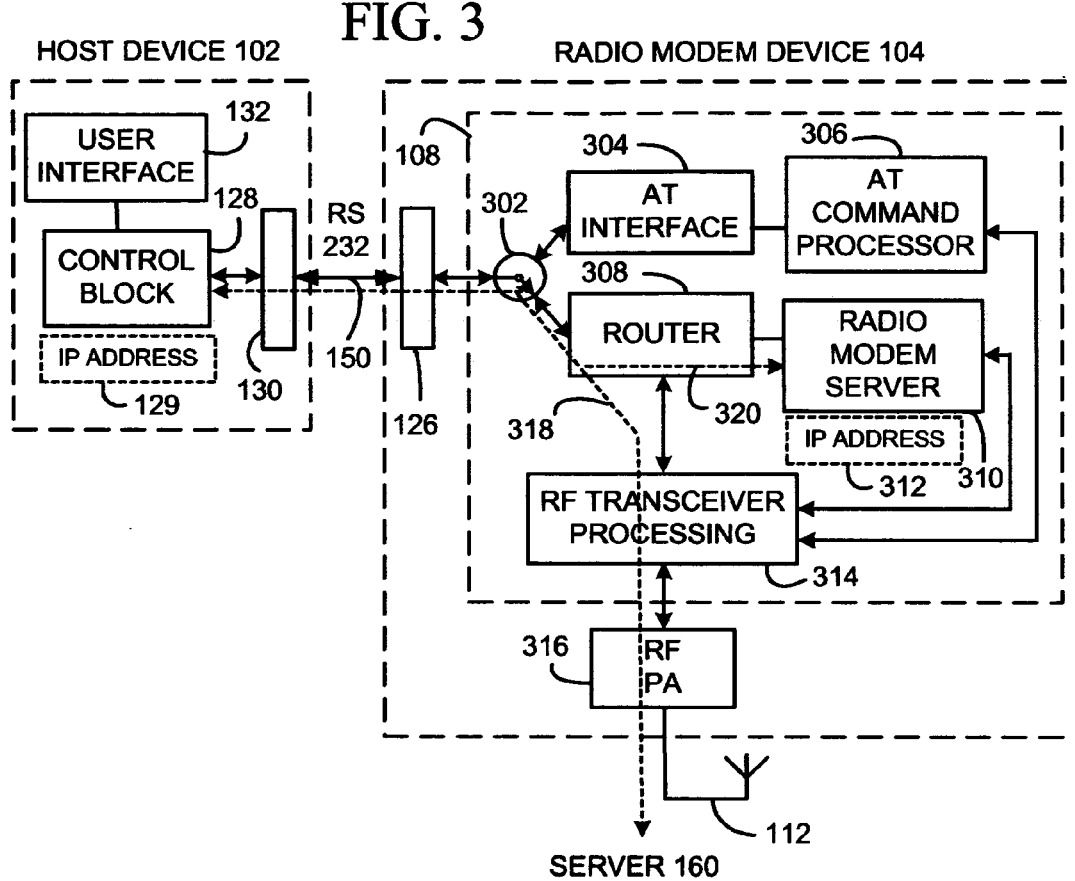
FIG. 3 is a more detailed block diagram of the radio modem device which is coupled to the host device.

Referring now to FIG. 3, a more detailed block diagram of radio modem device 104 is shown to describe more particular aspects related to the present invention. As shown in FIG. 3, radio modem device 104 includes an interface switching mechanism 302, an AT interface 304, an AT command processor 306, a router 308, a radio modem server 310, an RF transceiver processing block 314, and an RF power amplifier (PA) 316. Preferably, interface switching mechanism 302, AT interface 304, AT command processor 306, router 320, radio modem server 310 and RF transceiver processing block 314 are included as a part of the same control block 108. Control block 108 is preferably embodied as one or more processors (such as a microprocessor) with its components implemented as software processes.

Interface 126 is coupled to interface switching mechanism 302 which switches between either AT interface 304 (for AT command processing) or router 308 (for data communication sessions between host device 102 and server 160). When in an AT command processing mode, interface switching mechanism 302 is switched such that interface 126 is coupled to AT interface 304. AT interface 304 is coupled to AT command processor 306 for interfacing AT command and response information between host device 102 and AT command processor 306. AT commands are one well-known type of modem commands and may be referred to as "Hayes" modem commands. Some basic AT commands include "D" for dialing a telephone number, "A" for answering an incoming call, "H" for hook status, and "Z" for reset, as examples; many other AT modem commands are available. AT command processor 306 is also coupled to RF transceiver processing block 316 to access or process radio-specific information, such as radio signal strength or wireless network operator identification, when needed. The radio-specific information may include, for example, radio signal strength information (e.g. a received signal strength indicator or RSSI) or wireless network operator information.

Router 308 is coupled to interface switching mechanism 302 and RF transceiver processing block 314 for routing data packets of a data communication session 318 (shown as a dashed line) between host device 102 and server 160 over the RF link. When in a data communication mode, interface switching mechanism 302 is switched such that interface 126 is coupled to router 308. Preferably, data communication session 318 between host device 102 and server 160 utilizes an IP connection. The data communicated may involve that of any suitable application, including e-mail information, calendar or appointment information, voicemail notifications, web page downloads, etc.

Router 308 is also coupled to radio modem server 310 for routing data packets of a data communication session 320 between host device 102 and radio modem server 310. The data packets from host device 102 to radio modem device 104 carry radio modem commands which are processed at radio modem server 310. Radio modem server 310 generates responses to the modem commands, and this response information is passed back through router 320 in the form of data packets addressed to host device 102. Performing as described, radio modem server 310 may be referred to as a modem command processing server. Such communication and processing can occur during data communication session 318 between host device 102 and server 160. Like data communication session 318, data communication session 320 between host device 102 and radio modem server 310 utilizes an IP connection. Radio modem server 310 is also coupled to RF transceiver processing block 316 to access or process radio-specific information, such as radio signal strength (e.g. received signal strength indictor or RSSI) or wireless network operator identification, when needed. Host device 102 uses this information for visual display or other purposes as needed.

Further describing FIG. 3 operation, radio modem device 104 operates in a first operational mode and a second operational mode. These operational modes are mutually exclusive modes for the radio modem device. That is, the radio modem device operates in one and only one of these modes at any given time. In the first operational mode, radio modem device 104 is operative to receive, process, and respond to modem commands (e.g. AT modem commands) from host device 102. Here, interface switching mechanism 302 is switched to provide communication between host device 102 and AT command processor 306 through AT interface 304. Thus, AT command and response information may be communicated between host device 102 and radio modem device 104 in this mode. In the second operational mode, radio modem device 104 is operative to communicate data packets of data communication session 318 between host device 102 and server 160 over an'RF link. An IP connection is preferably used for data communication session 318. Here, interface switching mechanism 302 is switched to facilitate communication between host device 102 and router 320. Router 320 routes data packets addressed to server 160 through RF transceiver processing block 314 for communication to server 160 over the RF link, and routes data packets addressed to host device 102 through RF transceiver processing block 314.

While data communication session 318 is established, however, host device 102 may also transmit data packets which carry modem commands intended for receipt and processing by radio modem device 104. This may also be carried out in data communication session 320 between host device 102 and radio modem device 104, which also utilizes an IP connection. Thus, during data communication session 318, radio modem device 104 is operative to receive data packets from host device 102 that carry radio modem commands, process the radio modem commands, and transmit data packets to host device 102 which carry responses to the radio modem commands. Router 308 identifies data packets addressed to radio modem server 310 which are routed to radio modem server 310 for radio modem command and response processing. Conversely, router 308 identifies data packets addressed to particular applications at host device 102 and are accordingly sent thereto. Advantageously, radio-specific information may be obtained from radio modem device 104 even during data communication session 318 between host device 102 and network server 160.

As described above, data communication session 320 between host device 102 and radio modem server 310 preferably utilizes an IP connection. Preferably, data communication session 320 also involves the encapsulation of datagram protocols based on a Point-to-Point Protocol (PPP) standard. For example, the PPP may be based on the methodology described in "*The Point-to-Point Protocol (PPP)*", Request For Comments (RFC) 1661, issued in July 1994 by the Internet Engineering Task Force (IETF). In general, PPP is the Internet standard for transporting IP packets over standard asynchronous serial lines. PPP provides a method for encapsulating datagrams over serial links so that, for example, a PC may connect to the Internet through a telephone line with use of a modem. PPP also provides a Link Control Protocol (LCP) for establishing, configuring, and testing the data-link connection, as well as a family of Network Control Protocols (NCPs) for establishing and configuring different network-layer protocols. PPP session establishment or connection utilizes three "phases" which include a link establishment phase, an (optional) authentication phase, and a network-layer protocol phase, which use known methodologies.

Furthermore, data communication session 320 between host device 102 and radio modem server 310 also preferably involves the use of a User Datagram Protocol (UDP). In general, UDP is a connectionless transport-layer protocol (Layer 4) that belongs to the Internet protocol family. UDP is basically an interface between IP and upper-layer processes. UDP "ports" distinguish multiple applications running on a single device from one another. A UDP packet format typically contains four fields which include a source port field, a destination port field, a length field, and a checksum field. In the present embodiment, a unique UDP data header is also utilized to identify modem command and response data.

In delivering data packets to radio modem server 310 in the embodiment described, host device 102 sends data packets with a destination address that matches an IP address 312 of radio modem server 310 and a UDP port number associated with such modem command processing. IP address 312 assigned to radio modem device 104 may be any suitable IP address. IP address "10.0.0.1", for example, may be utilized. Any suitable UDP port number may be assigned as well, such as UDP port number 52790, which is arbitrarily chosen. Thus, in the present embodiment, the complete address used to deliver data packets to radio modem device 104 may be 10.0.0.1:52790. To communicate or respond to host device 102, radio modem server 310 utilizes IP address 129 and the UDP port number of the corresponding application. As mentioned above, a unique UDP data header may also be utilized to identify modem command and response data.

FIG. 4 is a flowchart for describing a method of operation for the radio modem device of FIGS. 1-3. The flowchart of FIG. 4 relates to a radio modem device which operates in a first operational mode and a second operational mode. The first operational mode may be referred to as an AT command mode and the second operational mode may be referred to as a network data session mode. Beginning at a start block 402 of FIG. 4, the radio modem device is operating in either the AT command mode or the network data session mode (step. 404). If the radio modem device is in the AT command mode, then the radio modem device operates to receive, process, and respond to AT commands from a host device (step 406). If the radio modem device is in the network data session mode, then the radio modem device operates to facilitate a data communication session between the host device and a server of a communication network through a radio frequency (RF) link (step 408). In doing so, the radio modem device operates to communicate data packets of the data communication session between the host device and the server through the RF link (step 408). The data communication session preferably utilizes an IP connection.

During the data communication session, the radio modem device monitors a destination address field of the data packets to identify whether the destination address matches an IP address (and e.g. UDP port number) of the radio modem server (step 410). If the destination address of the data packets does not match the IP address (including e.g. the UDP port number) of the radio modem server ("NO" branch of step 410), then the data packets are intended for receipt by the network and the radio modem device continues to facilitate the data communication session in step 408. On the other hand, if the destination address of the data packets does match the IP address (including e.g. the UDP port number) of the radio modem server at step 410 ("YES" branch of step 410), then the radio modem server itself receives and processes these data packets. In particular, the radio modem server identifies and processes a radio modem command in the data packets which is from the host device (step 412). In processing the radio modem command, the radio modem server produces response information which is transmitted back to the host device in the form of data packets addressed to the IP address (and e.g. its associated UDP port number) of the host device. Preferably, as described earlier above, a unique UDP data header may also utilized to identify modem command and response data.

Thus, even during the data communication session, the radio modem device is operative to receive one or more data packets from the host device which carry radio modem commands, process the radio modem commands, and transmit data packets to the host device which carry responses to the radio modem commands. Advantageously, radio-specific information may be obtained by the host device from the radio modem device even during data communication sessions between the host device and the network server.

Figure 5:
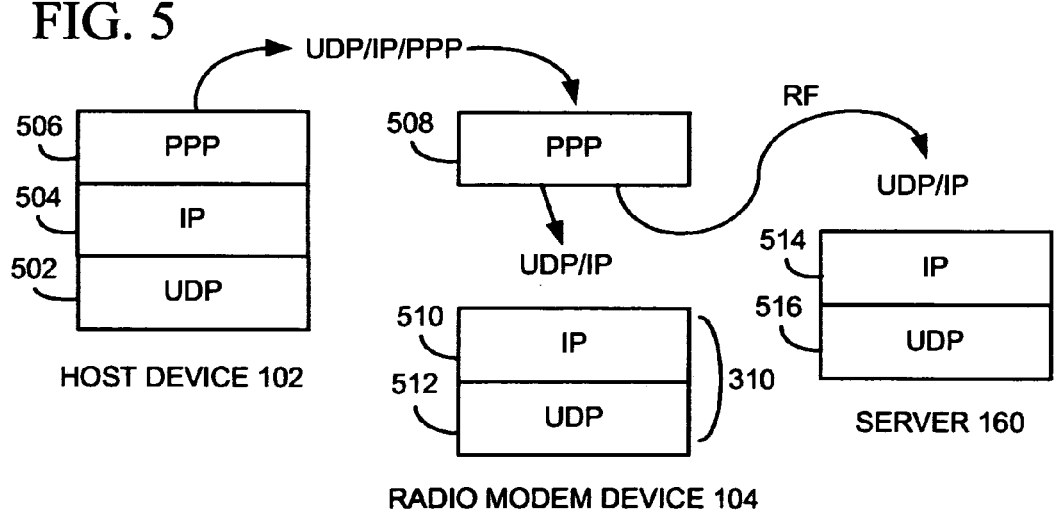
FIG. 5 is an illustration of several software protocol layers which may be utilized in the communication of data packets in the detailed embodiment described.

FIG. 5 is an illustration of a several software protocol layers which may be utilized in the communication of data packets in the embodiment described. An example of transmission of data packets from host device 102 to server 160 and radio modem server 310 will be described; however it is readily apparent that the response and reception of data may be employed accordingly. In host device 102, a UDP layer 502 generates a UDP packet (e.g. at the user interface) which is destined for an application on server 160. The UDP packet is received at an IP layer 504 of host device 102 and wrapped in an IP packet. This resulting UDP/IP packet is received at a PPP layer 506 of host device 102 and wrapped in a PPP packet. The resulting UDP/IP/PPP packet is sent to radio modem device 104 through wired connection 150 (e.g. the RS-232 interface). In radio modem device 104, a PPP layer 508 receives the UDP/IP/PPP packet and removes the PPP packet wrapper for further processing. Identifying that the UDP/IP packet is destined for server 160, it is sent to the RF transceiver processing block for communication and transmission over the RF link. The UDP/IP packet is then received at server 160, being processed at an IP layer 514 which removes the IP packet layer. The underlying UDP packet is processed by a UDP layer 516 of server 160. Of course, TCP may be alternatively utilized when sending data packets back and forth between host device 102 and server 160.

After the PPP wrapper is removed in PPP layer 508 of radio modem device 104, however, the underlying UDP/IP packet may be identified as being destined for radio modem server 310(e.g. the "10.0.0.1" IP address). In this case, the UDP/IP packet is sent to an IP layer 510 of radio modem server 310 which removes the IP wrapper. In a UDP layer 510 of radio modem server 310, the resulting UDP packet should match the UDP port number (e.g. 52790) and, if so, radio modem server 310 processes the underlying "modem command" in the packet. UDP port numbers that do not match may be rejected. Similarly, radio modem server 310 produces response information which is transmitted back to host device 102 in the form of data packets addressed to the IP address of host device 102 (and e.g. its associated UDP port number for the application).

QUIP: A Specific Implementation. In one particular embodiment, the technique may be referred to as a Queried UDP Information Protocol or "QUIP". QUIP is a specific protocol for passing modem status requests and responses between the host device and the radio modem device. A UDP, running over the existing IP/PPP link between the host device and the network, is used to transport QUIP packets. QUIP is implemented on the radio modem device as a small UDP service. Packets addressed to the QUIP UDP port of the radio modem device are intercepted and processed. Responses will be returned to the host device's sending IP address-port.

In this embodiment, UDP address 10.0.0.1:52790 is assigned to the radio modem device. IP address 10.0.0.1 is used because packets are easily addressed (no discovery is required—every radio modem device uses the same address). Port 52790 is an arbitrary port number chosen from the reserved/dynamic range; any suitable port number may be chosen. In the unlikely case of a non-QUIP use of address 10.0.0.1:52790, packets received from the host device that do not contain a "magic cookie" (see below) will be forwarded to the network over the RF link.

QUIP Data Format. A summary of the QUIP packet header is shown below. The fields are transmitted from left to right. Every QUIP packet contains the following header:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                          Magic Cookie                         |
+-+-+-+-+-+-+-+-+-+-+-+-+-+-+-+-+-+-+-+-+-+-+-+-+-+-+-+-+-+-+-+-+
|   Identifier  |             Reserved (Must be ZERO)           |
+-+-+-+-+-+-+-+-+-+-+-+-+-+-+-+-+-+-+-+-+-+-+-+-+-+-+-+-+-+-+-+-+
|   Data ...
+-+-+-+-+
```

For example, consider the following:

```
struct QUIPPacketHeader {
    DWORD MagicCookie;
    BYTE Identifier;
    BYTE Reserved[3];
    BYTE Data[...];
};
Packet example = { 0x50495551, 0x12, 0, 0, 0,
        { 0x01, 0x02, 0x03, 0x04, ... } };
Send(&example) will produce the following byte stream, starting at the left:
    0x51 0x55 0x49 0x50 0x12 0x00 0x00 0x00 0x01 0x02 0x03 0x04 ...
```

The Magic Cookie (32 bits) field identifies the packet as a QUIP type (see Constraints below). The Identifier field is a sequence counter for matching requests and replies. To send a new request, increment the sequence counter, fill in the data portion, and send the packet. Expect a response with exactly the same identifier. The Reserved field (24 bits) is reserved for future expansion and should be zero.

QUIP Commands. The Data field of every QUIP Packet has the following header:

```
struct QUIPCmdHeader {
    WORD CommandCode;
    WORD Reserved;
};
```

The Command Code field (15+1 bits) identifies the command type. If a packet is received with an unknown Code field, a Code-Reject packet is transmitted. Current valid codes include: Code-Reject, Code-CREG, Code-RCIQ, Code-COPS, and Code-CGATT (see Constraints below). The '*' flag (the most significant bit of the Command Code) indicates the originating end. A '1' indicates that the host device sent the packet; a '1' indicates that the radio modem device sent the packet. For example, consider the command "0x1ABC". The Command Code of the response will be "0x9ABC". The Reserved field (24 bits) is reserved for future expansion and should be zero. The Data field is dependent upon the specific command. "Code-Reject" Description. Reception of a QUIP packet with an unknown Command Code indicates that the peer is operating with a different version. This must be reported back to the sender of the unknown code by transmitting a Code-Reject. Note that sending a Code-Reject to the radio modem device will cause Code-Reject to be returned. This is a way to request the QUIP Version Number. A summary of the Code-Reject packet format is shown below. The fields are transmitted from left to right.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|        Command Code           |*|       Reserved (Must be ZERO)|
+-+-+-+-+-+-+-+-+-+-+-+-+-+-+-+-+-+-+-+-+-+-+-+-+-+-+-+-+-+-+-+-+
|   Data ...
+-+-+-+-+-+-+-+-+-+-+-+-+-+-+-+-+-+-+-+-+-+-+-+-+-+-+-+-+-+-+-+-+
```

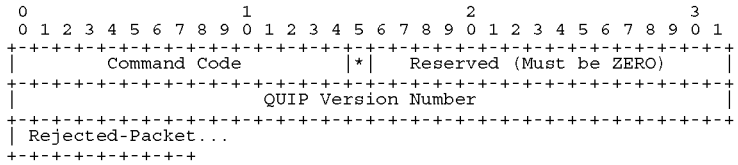

Command Code field is 0x0000 for Code-Reject. The QUIP Version Number field identifies the QUIP protocol version—current 1.0.1.0 (that is, 0x01000100). The Rejected-Packet field contains a copy of the QUIP packet which is being rejected. The Rejected-Packet should be truncated to comply with the peer's established MRU (1492 bytes).

"Code-CREG" Description. See "AT+CREG?" in the AT Command specification. A summary of the Code-CREG packet format is shown below. The fields are transmitted from left to right.

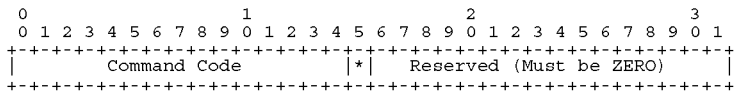

The Command Code field is 0x0001 for Code-CREG.

"Code-CREG" Response Description. See "AT+CREG? Response" in the AT Command specification. A summary of the Code-CREG packet format is shown below. The fields are transmitted from left to right.

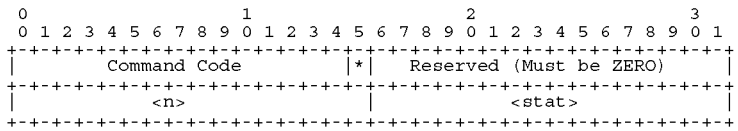

The Command Code field is "0x8001" for Code-CREG Response. For <n>, see the AT specification (0=Network registration unsolicited result code disabled (default); and 1=Network registration unsolicited result code enabled +CREG. For <stat>, see the AT specification (0=Not registered, ME is not currently searching a new operator to which to register; 1=Registered, home network; 2=Not registered, but ME is currently searching a new operator to which to register; 3=Registration denied; 4=Unknown; 5=Registered, roaming).

"Code-RCIQ" Description. See "AT+RCIQ?" in the AT Command specification. A summary of the Code-RCIQ packet format is shown below. The fields are transmitted from left to right.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|        Command Code           |*|    Reserved (Must be ZERO)  |
+-+-+-+-+-+-+-+-+-+-+-+-+-+-+-+-+-+-+-+-+-+-+-+-+-+-+-+-+-+-+-+-+
```

The Command Code field is "0x0002" for Code-RCIQ.

"Code-RCIQ?" Response Description. Code-RCIQ Response. A summary of the Code-RCIQ packet format is shown below. The fields are transmitted from left to right.

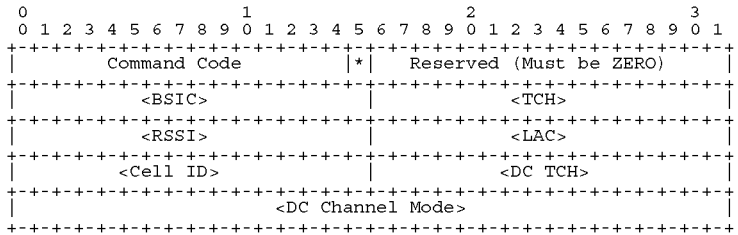

The Command Code field is 0x8003 for Code-RCIQ Response. Serving Cell Information: <BSIC>, <TCH>, <RSSI>, <LAC>, <Cell ID>(See the AT specification). Dedicated Channel Information: <DC TCH>, <DC Channel Mode>.

"Code-COPS" Description. See "AT+COPS?" in the AT Command specification. A summary of the Code-COPS packet format is shown below. The fields are transmitted from left to right.

The Command Code field is 0x8003 for Code-RCIQ Response. <Operator Name> is the Network Operator Name (26 bytes); <Short Operator Name> is the Network Operator Name (8 bytes); and <MCC>/<MNC> are the GSM location and area identification number.

"Code-CGATT" Description. See "AT+CGATT?" in the AT Command Specification. A summary of the Code-CGATT packet format is shown below. The fields are transmitted from left to right.

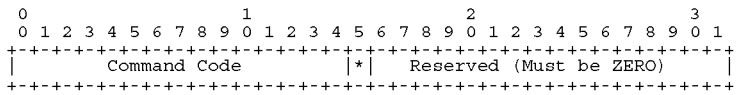

The Command Code field is "0x0003" for Code-COPS.

"Code-COPS" Response Description. See "AT+COPS?" Response in the AT Command specification. A summary of the Code-COPS packet format is shown below. The fields are transmitted from left to right.

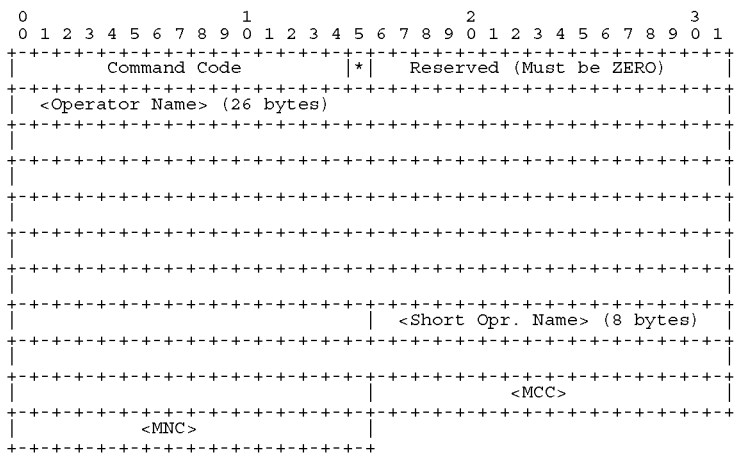

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|         Command Code          |*|    Reserved (Must be ZERO)  |
+-+-+-+-+-+-+-+-+-+-+-+-+-+-+-+-+-+-+-+-+-+-+-+-+-+-+-+-+-+-+-+-+
```

The Command Code field is "0x0004" for Code-CGATT.

"Code-CGATT" Response Description. See "AT+CGATT?" Response in the AT specification. A summary of the Code-CGATT packet format is shown below. The fields are transmitted from left to right.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|         Command Code          |*|    Reserved (Must be ZERO)  |
+-+-+-+-+-+-+-+-+-+-+-+-+-+-+-+-+-+-+-+-+-+-+-+-+-+-+-+-+-+-+-+-+
|<Attach State> |
+-+-+-+-+-+-+-+-+
```

The Command Code field is "0x8004" for Code-RCIQ Response. <Attach State> is GPRS Attach state (8 bit Boolean flag).

Future Expansion of QUIP. The QUIP modem commands described above parallel and are similar to AT commands. One ordinarily skilled in the art will appreciate that further modem commands, AT-like or not, can be easily added. Unlike AT, QUIP is not a strict command and response protocol. Because of such flexibility, a "register & push" system for certain information may be utilized as well. For example, it might be useful to register for RSSI updates and automatically receive periodic updates of the RSSI. Furthermore, multiple info requests could be combined into the same request packet. Similarly, multiple responses could be combined into the same response packet. It is also possible to fragment long responses into two or more packets.

Final Comments. What has been described are methods and apparatus for use in processing radio modem commands during network data sessions. In one illustrative example, a radio modem device operates in a first operational mode and a second operational mode. In the first operational mode, the radio modem device is operative to receive, process, and respond to AT commands from a host device. In the second operational mode, the radio modem device is operative to communicate data packets of a data communication session between the host device and a server of a communication network through a radio frequency (RF) link. During the data communication session, the radio modem device is further operative to receive data packets from the host device which carry radio modem commands, process the radio modem commands, and transmit data packets to the host device which carry responses to the radio modem commands. Advantageously, radio-specific information may be obtained by the host device from the radio modem device even during data communication sessions between the host device and the network server.

The above-described embodiments of the present application are intended to be examples only. Those of skill in the art may effect alterations, modifications and variations to the particular embodiments without departing from the scope of the application. The invention described herein in the recited claims intend to cover and embrace all suitable changes in technology.

The invention claimed is:

1. A method of processing commands from a host device during a data communication session between the host device and a server, the method being performed by a radio modem device which operates in a cellular telecommunications network and connects with the host device through a wired serial connection, the method comprising the steps of:
   maintaining a Point-to-Point Protocol (PPP) connection between the host device and the radio modem device over the wired serial connection;
   communicating, over a wireless link with the cellular telecommunications network, data packets of an IP connection maintained between the host device and the server;
   while the PPP and the IP connections are being maintained:
      removing a PPP wrapper of data packets to reveal a destination IP address and a destination UDP or TCP port number;
      identifying whether the destination IP address and the UDP or TCP port number match an IP address and UDP or TCP port number of a radio modem server of the radio modem device;
      in response to identifying a match between the IP addresses and the UDP or TCP port numbers, as well as identifying a cookie in the data packets that identifies a protocol type of a protocol utilized for communication of the commands:
      causing the data packets to be routed to the radio modem server, and processing and responding to the host device in accordance with a command and a sequence number in the data packets at the radio modem server so that the response to the host device includes the sequence number, but if the command is an unknown command code, responding to the host device with a version number of the protocol utilized at the radio modem device; and in response to identifying a mismatch between the IP addresses or the UDP or TCP port numbers, causing the data packets to be routed to the sewer over the wireless link with the cellular telecommunications network.

2. The method of claim 1, wherein the IP address and UDP or TCP port number of the radio modem device is fixed and the same for all radio modem devices which utilize the protocol.

3. The method of claim 1, wherein the command comprises a request for network information and the step of responding comprises responding to the host device with the network information.

4. The method of claim 1, wherein the command comprises a request for a received signal strength indicator (PSSI) and the step of responding comprises responding to the host device with the PSSI.

5. The method of claim 1, wherein the command comprises a request for network operator identification and the step of responding comprises responding to he host device with the network operator identification.

6. The method of claim 1, wherein the Wired serial connection comprises an RS-232 connection.

7. The method of claim 1, wherein the cellular telecommunications network operates in accordance with Global Systems for Mobile Communications (GSM) and General Packet Radio Service (GPRS).

8. A radio modem device which operates in a cellular telecommunications network, comprising:
    a serial interface for coupling to a host device through a wired serial connection;
    a router coupled to the serial interface;
    a radio modem server coupled to the router;
    a radio frequency (RF) transceiver processor coupled to the router;
    the RF transceiver processor being configured to provide communications over a wireless link with the cellular telecommunications network;
    an RF power amplifier (PA) coupled to the RE transceiver processor;
    an antenna coupled to the RF PA;
    the router being configured to:
        facilitate a Point-to-Point Protocol (PPP) connection between the host device and the radio modem device over the wired serial connection;
        facilitate communication of data packets of an IP connection maintained between the host device and a server via the cellular telecommunications network;
        during the maintaining of the PPP and IP connections:
            remove a PPP wrapper of data packets to reveal a destination IP address and a destination UDP or TCP port number;
            identify whether the destination IP address and the UDP or TCP port number match an IP address and UDP or TCP port number of the radio modem server;
            in response to identifying a mismatch between the IP addresses or the UDP or TCP port numbers, cause the data packets to be routed to the server over the wireless !ink with the cellular telecommunications network;
            in response to identifying a match between the IP addresses and the UDP or TCP port numbers, as well as identifying a cookie in the data packets that identifies a protocol a protocol utilized for the communication of commands with the radio modem device: cause the data packets to be routed to the radio modem server;
    the radio modem server being configured to:
        receive the data packets having the destination IP address and the UDP or TCP port number that matches match the IP address and the UDP or TCP port number of the radio modem server; and
        process and respond to the host device in accordance with a command and a sequence number in the data packets, so that the response to the host device includes the sequence number, but if the command is an unknown command code, responding to the host device with a version number of the protocol utilized at the radio modem device.

9. The radio modem device of claim 8, wherein the IP address and the UDP or TCP port number of the radio modem server is fixed and the same for all radio modem devices which utilize the protocol.

10. The radio modem device of claim 8, wherein the modem command comprises a request for network information and the step of responding comprises responding to the host device with the network information.

11. The radio modem device of claim 8, wherein the command comprises a request for a received signal strength indicator (RSSI) and the step of responding comprises responding to the host device with the RSSI.

12. The radio modem device of claim 8, wherein the command comprises a request for network operator identification and the step of responding comprises responding to the host device with the network operator identification.

13. The radio modem device of claim 8, wherein the serial interface comprises an RS-232 interface.

14. The radio modem device of claim 8, wherein the RF transceiver processor operates in accordance with Global Systems for Mobile Communications (GSM) and General Packet Radio Service (GPRS).

15. A communication system, comprising:
    a host device;
    a cellular telecommunications network;
    a radio modem device which operates within the cellular telecommunications network;
    the radio modem device including:
        a serial interface for coupling to the host device through a wired serial connection;
        a router couplers to the serial interface;
        a radio modem server coupled to the router;
        a radio frequency (RF) transceiver processor coupled to the router;
        the RF transceiver processor being configured to provide communications over a wireless link with the cellular telecommunications network;
        an RF power amplifier (PA) coupled to the RF transceiver processor;
        an antenna coupled to the RE PA;
        the router being configured to:
            facilitate a Point-to-Point Protocol (PPP) connection between the host device and the radio modem device over the wired serial connection;
            facilitate communication of data packets of an IP connection maintained between the host device and a server via the cellular telecommunications network;
            during the maintaining of the PPP and IP connections:
                remove a PPP wrapper of data packets to reveal a destination IP address and a destination UDP or TCP port number:

identify whether the destination IP address and the UDP or TCP port number matches an IP address and UDP or TCP port number of the radio modem server;

in response to identifying a mismatch between the IP addresses or the UDP or TCP port numbers, cause the data packets to be routed to the server over the wireless link with the cellular telecommunications network;

in response to identifying a match between the IP addresses and the UDP or TCP port numbers, as welt as identifying a cookie in the data packets which identifies a protocol type of a protocol utilized for communication of commands with the radio modem device: cause the data packets to be routed to the radio modem server;

the radio modem sewer being configured to:

receive the data packets having the destination IP address and the UDP or TCP port number that match the IP address and the UDP or TCP port number of the radio modem server; and process and respond to the host device in accordance with a command and a sequence number in the data packets, so that the response to the host device includes the sequence number, but if the command is an unknown command code responding to the host device with a version number of the protocol utilized at the radio modem device.

16. The communication system of claim 15, wherein the IP address and the UDP or TCP port number of the radio modem server is fixed and the same for all radio modem devices which utilize the protocol.

17. The communication system of claim 15, wherein the modem command comprises a request for network information and the step of responding comprises responding to the host device with the network information.

18. The communication system of claim 15, wherein the command comprises a request for a received signal strength indicator (RSSI) and the step of responding comprises responding to the host device with the RSSI.

19. The communication system of claim 15, wherein the command comprises a request for network operator identification and the step of responding comprises responding to the host device with the network operator identification.

20. The communication system of claim 15, wherein the serial interface comprises an RS-232 interface.

21. The communication system of claim 15, wherein the RF transceiver processor operates in accordance with Global Systems for Mobile Communications (GSM) and General Packet Radio Service (GPRS).

* * * * *